United States Patent Office 3,825,520
Patented July 23, 1974

3,825,520
SMOKE-RETARDANT STYRENE POLYMER COMPOSITIONS CONTAINING A METAL PHTHALOCYANINE
Leo P. Parts, Dayton, and John T. Miller, Jr., West Carrollton, Ohio, assignors to Monsanto Research Corporation, St. Louis, Mo.
No Drawing. Filed Dec. 29, 1972, Ser. No. 319,963
Int. Cl. C08f 45/62
U.S. Cl. 260—45.75 R                         1 Claim

ABSTRACT OF THE DISCLOSURE

Smoke-retardant polymer compositions comprising a styrene polymer and at least a sufficient amount of an iron, copper, manganese, vanadyl or cobalt phthalocyanine to reduce smoking.

BACKGROUND OF THE INVENTION

1. Field of the Invention

Smoke-retardant polymer compositions.

2. Description of the Prior Art

The phthalocyanines are among the thermally most stable coordination compounds (P. A. Barrett, C. E. Dent and R. P. Linstead, J. Chem. Soc., 1937, 1719). They have been used as structural units in thermally stable polymers.

SUMMARY OF THE INVENTION

Smoke-retardant polymer compositions comprising a styrene polymer and at least a sufficient amount of an iron, copper, manganese, vanadyl or cobalt phthalocyanine to reduce smoking.

DESCRIPTION OF THE PREFERRED EMBODIMENTS

The phthalocyanine derivatives of metals should meet the following major requirements to be most effective as smoke retardants in polymers:

1. They should be oxidatively and hydrolytically stable under the conditions of normal use of the polymers into which they are incorporated.
2. They should be thermally stable at the polymer pyrolysis temperature and they should volatilize with the pyrolyzate.
3. The oxides formed from them in the flame zone should function as catalysts for the oxidation of soot, into which they become incorporated in the flame.

Specifically the phthalocyanine metal derivatives that are incorporated into polymers as smoke oxidation catalyst precursors should meet the following requirements:

(1) Form oxides that are oxidation catalysts for carbon.
(2) Be thermally stable at temperatures that prevail in the condensed phase below the flame zone.
(3) Have sufficiently high vapor pressures to vaporize at temperatures that prevail at the surface of the pyrolyzing polymer (~300 to 500° C.).
(4) Vaporize at a rate that is proportional to the rate of pyrolyzate production.
(5) Be hydrolytically stable.
(6) Have no adverse effects on the physical properties of polymers.
(7) Cause no increase of flammability.
(8) Be effective in fire-retardant-containing polymer systems.
(9) Cause no environmental problems during polymer processing nor with end-use items.

The phthalocyanines are effective in styrene polymers such as polystyrene, styrene/acrylonitrile copolymers, styrene/butadiene copolymers, styrene/acrylonitrile/butadiene copolymers and other styrene copolymers. Styrene/acrylonitrile/butadiene copolymers are defined for the purposes of this application and the claims thereof to include the conventional ABS plastics which are composed of styrene-acrylonitrile copolymers as a continuous phase and a dispersed phase of butadiene-acrylonitrile rubber, or a butadiene-containing rubber onto which styrene-acrylonitrile monomers are grafted. (ABS Plastics, Basdekis, 1964, Preface, by Reinhold Publishing Corporation). The phthalocyanines are also effective in structurally modified styrene polymers in which one or more hydrogen atoms of the monomeric units have been replaced by other substituents such as alkyl groups and halogen atoms.

EXPERIMENTAL

Preparation of Test Materials

Additives were blended with the thermoplastic resins by milling at temperaturues dependent upon the volatility of the additive being incorporated (normally 130–160° C.). The blended materials were then molded, by heating under pressure (130–160° C. and 1000–1500 p.s.i.), into ⅛-in. thick specimens. Test samples for smoke determinations were subsequently cut from these specimens.

Smoke Mass Measurement

Samples, ⅛-in. thick, weighing 0.50 (±0.01) gram are employed in the smoke mass determinations. The reported measurements were conducted with the Monsanto controlled environment combustion chamber. The sample is ignited with a small hydrogen torch and exposed during combustion to an energy flux of 3.7 watts/cm.$^2$ supplied by the Globar source. Air is drawn through the test chamber at a rate of 8.1 cm./sec. The smoke particles are collected on a fiberglass filter that is mounted in the exit port of the combustion chamber.

The sample, sample holder, and the fiberglass filter are weighed before and after combustion and values for the smoke mass and combustion residue are thus obtained. A minimum of three determinations are conducted with each test material.

The candidate smoke-retardant materials were evaluated by their effect on smoke mass generated during burning of the polymer compositions into which they were incorporated. The effects of smoke retardants on combustion residue (char) values were determined. With most compositions, the burning times were determined; these are inversely related to the combustion rates: The effects of smoke-retardant additives on the flammability of polymers were also determined.

Results of experiments using phthalocyanines as smoke retardants in polymers are shown in Tables I and II which follow.

TABLE I.—EFFECT OF PHTHALOCYANINE SMOKE-RETARDANTS ON SMOKE MASS AND OXYGEN INDEX IN POLYSTYRENE [a]

| Additive | Additive content (wt. percent [c]) | Smoke mass measurements [b] | | Burning time (min.) | Oxygen Index [d] |
|---|---|---|---|---|---|
| | | Smoke (wt. percent) | Combustion residue (wt. percent) | | |
| None | | 21.3 | 0.2 | 1.13 | 18.6 |
| Fe(pc) | 25.4 | 4.7 | 8.7 | 2.08 | 19. |
| Cu(pc) | 22.7 | 7.8 | 16.9 | 2.38 | 19.1 |
| Mn(pc) | 25.8 | 10.0 | 6.8 | 2.17 | 19.3 |
| VO(pc) | 28.4 | 11.1 | 15.5 | 1.47 | 19.6 |
| Co(pc) | 24.2 | 12.2 | 18.2 | 1.44 | 19.6 |
| Ba(pc) | 11.8 | 19.0 | 4.2 | 1.19 | |
| Pb(pc) | 8.7 | 20.1 | 3.8 | 1.33 | 18.6 |

[a] Lustrex HF 77 marketed by Monsanto Company.
[b] These measurements were made with the Monsanto controlled environment combustion chamber.
[c] Metal content 2.5 wt.-percent in all samples that contained additives.
[d] ASTM D-2863-20. Oxygen Index is the minimum concentration of oxygen, expressed as percent by volume, in a mixture of oxygen and nitrogen which will just support combustion of a material under conditions of this method.

TABLE II.—EFFECT OF PHTHALOCYANINE SMOKE-RETARDANTS ON SMOKE MASS AND OXYGEN INDEX IN ABS [a,b]

| Additive | Additive content (wt. percent) | Smoke mass measurements | | | Oxygen Index |
| | | Smoke (wt. percent) | Combustion residue (wt. percent) | Burning time (min.) | |
|---|---|---|---|---|---|
| None | | 16.6 | 1.3 | 1.26 | 18.4 |
| Fe(pc) | 25.4 | 3.8 | 6.0 | 2.94 | 20.3 |
| Mn(pc) | 25.8 | 5.7 | 8.8 | 2.66 | |
| Cu(pc) | 22.7 | 6.0 | 24.7 | 3.03 | |
| VO(pc) | 28.4 | 7.6 | 15.8 | 2.35 | |
| Co(pc) | 24.2 | 10.6 | 24.3 | 1.81 | |

[a] Lustran ABS 640.
[b] See footnotes (b) and (c) to Table I.

The effectiveness of smoke-retardants, on the basis of unit weight of the incorporated additive, diminishes with increasing content.

Vapor Phase Smoke-Retardants in Fire-Retardant Polymer Systems

The effectiveness of vapor phase smoke-retardants was explored in bromine-, and phosphate-FR-containing polymer systems. With the latter type of fire-retardants, incorporated at high concentrations, the effectiveness of the vapor phase smoke-retardant additives was either somewhat reduced or completely destroyed (see Table III).

Octabromobiphenyl was used as a thermally stable bromine-containing model fire retardant. Iron-containing smoke retardants, when used in octabromobiphenyl-containing ABS, caused a significant increase in char mass and reduction of smoke.

Table IV contains data on the effect of phthalocyanines on the flammability of fire-retardant ABS compositions.

Although the invention has been described in terms of specified embodiments which are set forth in considerable detail, it should be understood that this is by way of illustration only and that the invention is not necessarly limited thereto since alternative embodiments and operating techniques will become apparent to those skilled in the art in view of the disclosure. For example, glass-forming additives such as $Mg(OH)_2 + (NH_4PO_3)_n$, can be added to the polymers in sufficient amounts to reduce smoking due to smoldering combustion, and these additives are in addition to the phthalocyanine to reduce smoking due to flaming combustion. Of the order of about 10% by weight each of $Mg(OH)_2$ and $(NH_4PO_3)_n$ based on the polymer will normally be sufficient to substantially reduce smoking due to smoldering combustion. Accordingly, modifications are contemplated which can be made without departing from the spirit of the described invention.

What is claimed is:

1. A smoke-retardant polymer composition comprising a styrene polymer, Octabromobiphenyl fire-retardant and at least a sufficient amount to reduce smoking of a metal phthalocyanine selected from the class consisting of iron phthalocyanine, copper phthalocyanine, manganese phthalocyanine, vanadyl phthalocyanine and cobalt phthalocyanine.

TABLE III.—PHTHALOCYANINE SMOKE-RETARDANTS IN FIRE-RETARDANT ABS AND STYRENE POLYMER SYSTEMS

| Polymer type | FR additive | | SR additive | | Smoke mass measurements, (wt. percent) | | |
| | Formula | Content (wt. percent) | Formula | Content (wt. percent) | Smoke | Comb. residue | Burning time |
|---|---|---|---|---|---|---|---|
| Lustran ABS 640 | | | | | 16.6 | 1.3 | 1.26 |
| | $C_{12}H_2Br_8$ | [b] 24.4 | | | 20.4 | 8.5 | 1.36 |
| | $C_{12}H_2Br_8$ | [b] 24.4 | Fe(pc) | 25.4 (2.5% Fe) | 10.5 | 36.6 | 1.91 |
| | $C_{12}H_2Br_8$ | [b] 24.4 | VO(pc) | 28.4 (2.5% V) | 7.9 | 28.0 | 1.55 |
| | $(C_6H_5O)_3PO$ | [c] 21.1 | | | 22.0 | 2.7 | 1.19 |
| | $(C_6H_5O)_3PO$ | [c] 21.1 | VO(pc) | 28.4 (2.5% V) | 16.6 | 27.0 | 2.54 |
| | $(C_6H_5O)_3PO$ | [c] 21.1 | Mn(pc) | 25.8 (2.5% Mn) | 15.7 | 13.2 | 2.95 |
| | $(C_6H_5O)_3PO$ | [c] 21.1 | Co(pc) | 24.2 (2.5% Co) | 20.3 | 23.0 | 1.58 |
| | $(C_6H_5O)_3PO$ | [c] 21.1 | Cu(pc) | 23.7 (2.5% Cu) | 21.0 | 21.1 | 2.43 |

[a] 1 in. x 2 in. x 1/8 in. specimens used.
[b] 20 wt. percent bromine.
[c] 2 wt. percent phosphorus.

TABLE IV.—THE EFFECT OF SMOKE-RETARDANTS ON THE FLAMMABILITY OF FIRE-RETARDANT ABS COMPOSITIONS

| Polymer | FR additive | | SR additive | | Flammability test results | | |
| | Formula | Content (wt. percent) | Formula | Content (wt. percent) | OI | UL-94 test, avg. burning time (sec.) | Flamm. rating [a] |
|---|---|---|---|---|---|---|---|
| Lustran ABS 640 | | | | | 18.1 | >25 | NSE |
| | $C_{12}H_2Br_8$ | [b] 24.4 | | | 24.1 | 1.3 | SE-O |
| | $C_{12}H_2Br_8$ | [b] 24.4 | Fe(pc) | 25.4 (2.5% Fe) | 33.1 | >25 | NSE |
| | $C_{12}H_2Br_8$ | [b] 24.4 | VO(pc) | 28.4 (2.5% V) | 32.6 | 5.6 | SE-I |

[a] NSE designates polymer compositions that are not self-extinguishing. SE-O indicates self-extinguishing polymers which do not release any flaming particles and which do not continue to flame longer than 5 sec. average of six flame applications (maximum not more than 10 sec.). SE-I is defined in the same manner as SE-O, except that the average time limit is 25 seconds (maximum 30 seconds). See Modern Plastics, October 1970, page 96.
[b] 20 wt. percent bromine, octabromobiphenyl.

References Cited

UNITED STATES PATENTS

| | | | |
|---|---|---|---|
| 2,489,226 | 11/1949 | Morris et al. | 260—41 |
| 3,291,746 | 12/1966 | Donoian et al. | 260—45.75 |
| 3,256,232 | 6/1966 | Tullsen et al. | 260—41 |
| 3,133,893 | 5/1964 | Newman | 260—41 |
| 3,188,295 | 6/1965 | Ballast et al. | 260—41 |

DONALD E. CZAJA, Primary Examiner

V. P. HOKE, Assistant Examiner

U.S. Cl. X.R.

260—41 C, 45.7 R, 45.7 P, 45.75 C, 45.9 R, 880 R